United States Patent Office 3,551,037
Patented Dec. 29, 1970

3,551,037
FILM-FEEDING MECHANISM FOR CARTRIDGE-LOADED MOTION PICTURE APPARATUS
Gottfried Pammer, Maria-Enzersdorf-Sudstadt, Austria, assignor to Karl Vockenhuber and Raimund Hauser, both of Vienna, Austria
Filed May 15, 1968, Ser. No. 729,225
Claims priority, application Austria, May 16, 1967, A 4,585/67
Int. Cl. G03b 1/56
U.S. Cl. 352—72                5 Claims

ABSTRACT OF THE DISCLOSURE

A belt-driven friction roller mounted on a horizontally-sliding bar feeds film from a cartridge. It enters a side opening in the cartridge and contacts the coil of film, driving the coil so that the leading film end emerges from the cartridge. The sliding bar moves toward the cartridge opening as a result of frictional force exerted by a spring brake located on the drive roller or on a second roller connected to the drive roller by the belt.

---

The invention relates to a cinematographic apparatus with cartridge loading, which cartridges comprise a supply reel and have an opening in the cartridge wall, into which a threading drive member is inserted for threading the film. The threading drive member is slidably or pivotally arranged on the apparatus and has a friction roller on its front portion, the friction roller being connected with at least one further roller by means of a belt. For threading the leading end of the film, the film is pushed out of the cartridge by the friction roller. It is necessary for this operation to insert the threading drive member into the cartridge housing and to switch on the driving means for the friction roller arranged on the threading drive member, and after the threading is effected, to withdraw the threading drive member from the cartridge by simultaneously switching off the friction roller drive, the apparatus being provided with rather complicated control means.

It is an object of the present invention to essentially simplify the control of the threading drive member by providing driving means, substantially fixed with respect to the equipment, whereby at least one of the rollers is coupled with a brake, the arresting moment of which is chosen in a way, that the pull acting on the belt during idling causes a displacement of the threading drive member.

It is another object of the invention to provide advantageously that the drive of the belt is reversible in its sense of rotation, so that upon switching of the drive in one direction of rotation, the threading drive member is displaced in its operating position and upon switching on the drive in the other direction of rotation, the threading drive member returns to its rest position.

It is still another object of the present invention, to provide a cinematographic apparatus wherein the threading drive member is kept in its rest position by means of a spring. Upon switching on the drive it is displaced to its operating position against the action of this spring and upon interruption of the drive it returns again in its rest position due to the force of the spring.

With the above and other objects in view, which will become apparent in the following detailed description, the present invention, which is disclosed by example only, will be clearly understood in connection with the accompanying drawings, in which.

Figure 1:
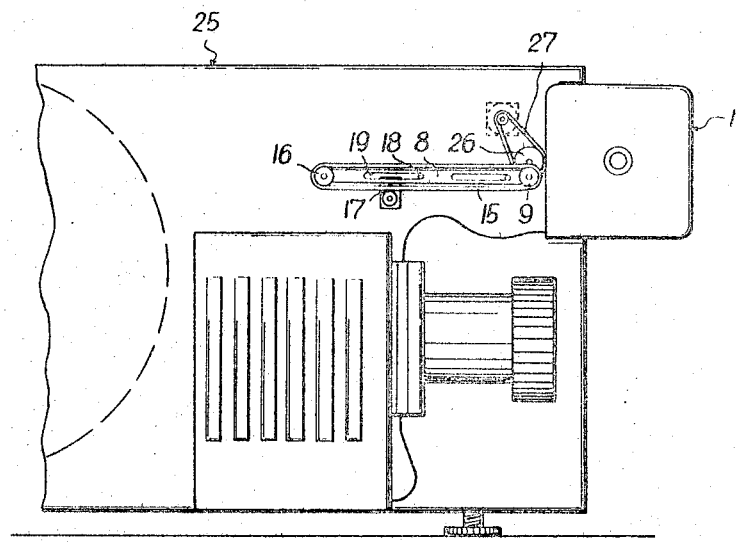
FIG. 1 is a side elevational view of a projector, partly broken away, with a device to push the leading end of the film out of the cartridge.
Figure 2:
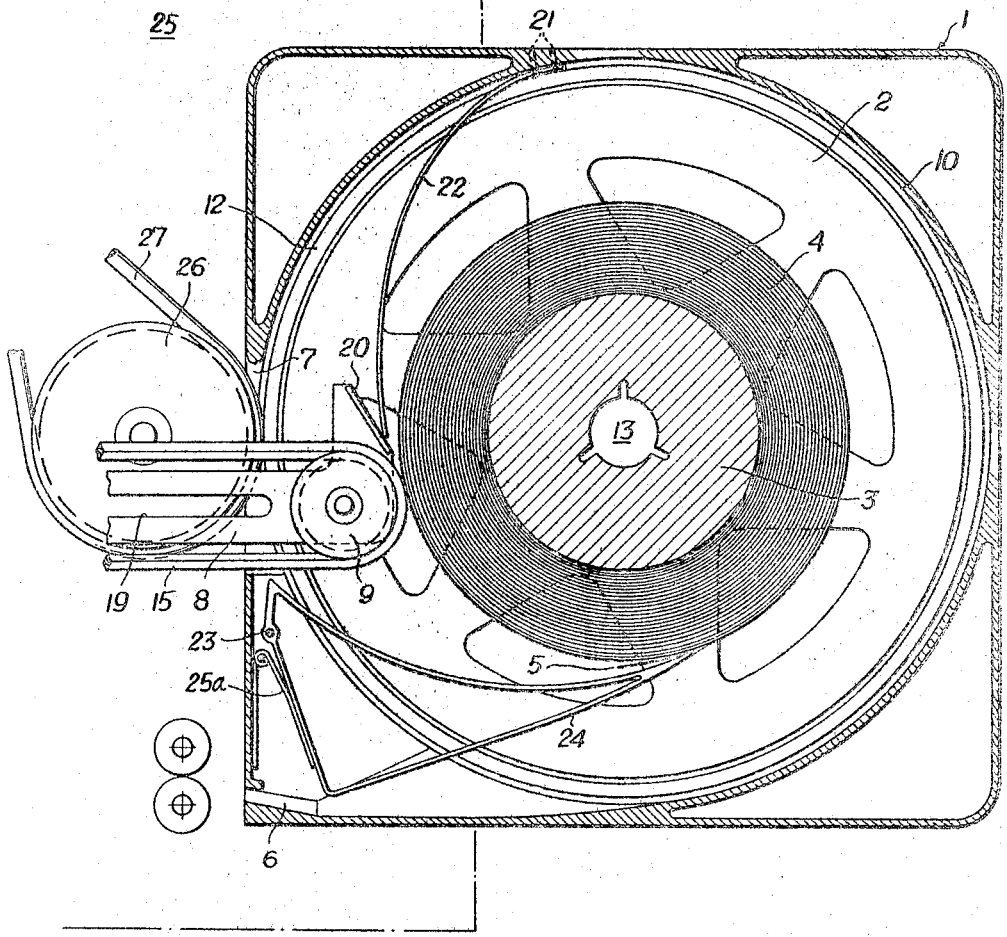
FIG. 2 is a cross section of the cartridge and illustrates the parts of the projector cooperating directly with the cartridge.
Figure 3:
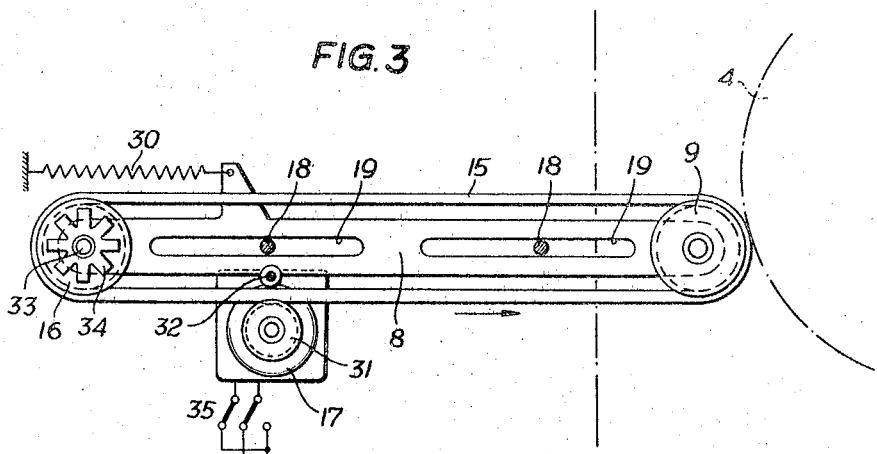
FIG. 3 is an elevational view of the shiftable threading drive member and its control means, with the reel coil illustrated in dashed lines.

Referring now to the drawings, a housing 1 has inside a supply reel 2 pivotally arranged, the latter being provided with a film coil 4 disposed on the core of the reel 3. Upon using the cartridge in cinematographic reproducing devices it is necessary to push the leading film end 5, which may have any position on the film coil, through an outlet opening 6 of the cartridge. For that purpose a threading drive member 8 is inserted into the cartridge through an opening 7 in the cartridge wall bearing on its front portion a friction roller 9. The friction roller 9 is received between the flanges of the reel 2 and operatively contacts the film coil by means of a belt 15 against the film coil. The belt preferably made of rubber at the same time establishes the drive connection. By the roller 9 rotating in counterclockwise sense the leading end of the film is moved in a more or less curved path in clockwise sense towards the outlet opening 6 of the cartridge, whereby the leading film end 5 generally abuts the inner cylindric cartridge wall 10. The threading drive member 8 is shiftable in longitudinal direction and guided by bolts 18, connected with the housing and operatively engaging longitudinal slots 19 of the threading drive member 8. The front portion of the threading drive member 8 is L-shaped and bears an oblique guiding surface. Upon inserting the threading drive member into the cartridge, the guiding surface 20 encounters a leaf spring 22, which is fastened to the inner cylindrical wall 10 of the cartridge by means of rivets 21 and abuts the inner cylindrical cartridge wall in its rest position. By inserting the threading drive member, the leaf spring is deviated between the flanges of the reel 2, so that a smooth runway for the leading film end results thereof, which has no bending point which could cause a buckling of the film. In the cartridge a stripper lever 24 is pivotally arranged on an axis 23 and is pressed to the circumference of the film coil by means of a spring 25a. By an adequate formation of the front portion of the stripper lever 24 it is guaranteed that it abuts only the range of the perforation of the film, so that damage to the pictures is avoided.

A friction wheel 12 is rotatably arranged in the cartridge 1, which has a central pin 13 upon which the film reel 2 is slipped. For rewinding the film into the cartridge, a roller 26 is suitably provided in the projector 25, the roller 26 being driven by a motor, not illustrated, by means of a belt 27 and is adapted to rotate the friction wheel 12.

Substantial for the present invention is that the driving motor 17 for the belt 15 is not arranged on the threading drive member 8, but is fixed to the equipment. The shaft of the motor 17 has a driving pulley 31. The belt 15 is looped further about a roller 16, which is rotatably arranged on the threading drive member 8 by means of a bolt 33. The roller 16 is braked by a spring plate 34 fastened to the bolt 33. A spring 30 acting on the threading drive member 8 biases to withdraw the threading drive member toward its left end position.

The mode of operation of this arrangement is as follows:

When, starting from the left end position of the threading drive member 8, the driving motor 17 is switched on, such a heavy pull occurs on the portion of the belt lying between the rollers 16 and 31 due to the arresting effect of the spring plate 34, that the threading drive member 8 is displaced to the right against the force of the spring 30. As soon as the roller 9 abuts the exterior circumference of the film coil 4, an additional arresting moment occurs, whereby the threading drive member 8 is displaced to the right with increasing force and the friction roller 9 is pressed to the film coil. After termination of the threading operation the drive is interrupted. Under the force of the spring 30 the threading drive member 8 returns to its rest position.

According to another embodiment the spring 30 may be omitted. In this arrangement the threading drive member is withdrawn in that the motor 17 is reversed in its direction of rotation. The reversal of the rotating direction is schematically indicated in the drawing by a pole-reverser 35.

For the purpose of the claims the supply reel is defined to include the film coil.

The present invention is not restricted to the illustrated embodiment. With the same advantages it may be applied for instance to film cameras, and sound tape and micro film instruments. Instead of a special motor drive for the friction roller, also a releasable driving connection with a central driving motor of the equipment may be provided.

While I have disclosed several embodiments of the present invention, it is to be understood that these embodiments are given by example only and not in a limiting sense.

I claim:
1. A cinematographic apparatus adapted to be loaded with film cartridges, comprising
   a supply reel arranged within one of said film cartridges including a film coil,
   a side wall of said film cartridge having an opening,
   a threading drive means having a front portion and a rear portion and being adapted to pass through said opening,
   rotatable friction roller means provided on said front portion of said threading drive means and being adapted to feed the film out of said cartridge,
   second roller means spaced from said friction roller means,
   belt means drivingly connecting said friction roller means and said second roller means,
   driving means arranged substantially fixed with respect to said apparatus and for operatively driving said roller means by said belt means,
   brake means adapted to brake at least one of said roller means,
   said threading drive means being movable to an operating position, in which said friction roller means operatively abuts said supply reel to drive the same, and to a rest position, in which said friction roller means is spaced from said supply reel, and
   said brake means having a braking torque chosen such that pulling forces occurring in an idle motion on said belt means causes a movement of said threading drive means.

2. The cinematographic apparatus, as set forth in claim 1, further comprising
   spring means on the one hand being fixed on said equipment and on the other hand acting on said threading drive means biasing the latter to its rest position, and
   said spring means being adapted to reset said support means from its operating position to its rest position, when arresting said driving means.

3. The apparatus, as set forth in claim 1, wherein
   said driving means for the friction roller means acts on a portion of the belt between both of said roller means of said threading drive means.

4. The apparatus, as set forth in claim 1, wherein
   said threading drive means is movably supported on said apparatus such that said movement of said threading drive means brings the latter first from said rest position into said operating position and thereafter feeds said film out of said cartridge.

5. The cinematographic apparatus as set forth in claim 4, further comprising
   reversing means for said driving means for reversing the direction of rotation of said driving means, causing a displacement of said threading drive means from said operating position to said rest position, when said reversing means is actuated after said operating position.

References Cited
UNITED STATES PATENTS

| | | | |
|---|---|---|---|
| 2,891,736 | 6/1959 | Blaes | 352—157X |
| 3,442,580 | 5/1969 | Winkler | 352—72X |

JOHN M. HORAN, Primary Examiner

K. G. HUTCHISON, Assistant Examiner

U.S. Cl. X.R.
352—78, 158